United States Patent [19]

Woo

[11] 4,376,831

[45] Mar. 15, 1983

[54] PHOSPHORIC ACID TREATED SULFUR CEMENT-AGGREGATE COMPOSITIONS

[75] Inventor: Gar L. Woo, Tiburon, Calif.

[73] Assignee: Chevron Research Company, San Francisco, Calif.

[21] Appl. No.: 364,570

[22] Filed: Apr. 1, 1982

[51] Int. Cl.$^3$ .............................................. C04B 33/04
[52] U.S. Cl. ............................... 501/140; 106/287.29; 106/287.32
[58] Field of Search ..................... 501/140; 106/287.29, 106/287.32

[56] References Cited

U.S. PATENT DOCUMENTS

| | | | |
|---|---|---|---|
| 3,954,480 | 5/1976 | Inderwick | 501/140 |
| 4,188,230 | 2/1980 | Gillott et al. | 501/140 |
| 4,247,336 | 1/1981 | Simic | 106/287.29 |
| 4,332,911 | 6/1982 | Nimer et al. | 501/140 |
| 4,332,912 | 6/1982 | Albom | 501/140 |

*Primary Examiner*—James Poer
*Attorney, Agent, or Firm*—D. A. Newell; T. G. DeJonghe; L. S. Squires

[57] ABSTRACT

Sulfur cement-aggregate compositions comprising sulfur cement, aggregate, and an amount of a phosphoric acid effective to improve the resistance of said compositions to freeze-thaw degradation. The compositions are prepared by the admixture of phosphoric acid to the molten composition or a component thereof.

The compositions can be used as mortars or concretes depending on the particle size of the principal aggregate component.

24 Claims, No Drawings

PHOSPHORIC ACID TREATED SULFUR CEMENT-AGGREGATE COMPOSITIONS

BACKGROUND OF THE INVENTION

1. The Invention

This invention relates to sulfur cement-aggregate compositions. In a further aspect, the invention relates to sulfur mortars and concretes having superior resistance to freeze-thaw degradation.

2. The Prior Art

Sulfur mortars and concretes generally refer to a mixture of sulfur and aggregate wherein the sulfur functions as the cement or binder. Generally, whether a composition is classed as a mortar or concrete is based on the particle size of the predominate aggregate. Thus, compositions containing larger sized aggregates are generally referred as concretes whereas compositions containing smaller sized aggregate are referred to as mortars. In either case, the compositions can also contain very fine particle size aggregates, such as fly ash, silica flour, etc., as fillers. Sulfur mortars and concretes are prepared by heating sulfur with an aggregate at a sufficient temperature to render the sulfur molten and then allowing the mixture to cool to solidify the sulfur. Not infrequently, the sulfur also contains a plasticizer which desirably modifies the sulfur, probably by reacting with at least a portion of the sulfur. Such sulfur is referred to as plasticized sulfur.

Sulfur mortars and concretes can be broadly classified as sulfur cement products. Sulfur cement is similar to Portland cement in forming concretes or mortars. In the latter case, a mixture of Portland cement and aggregate is solidified into a final solid product by treatment with water. In the case of sulfur products, heat is used to render the sulfur cement molten, which, upon cooling, solidifies, binding the aggregate.

Sulfur cement concretes can be used for many of the same purposes as conventionally formed concretes. For example, sulfur concretes can be used for structural members, roads, slabs, curbings, gutters, and can be precast or cast at the job site. Sulfur cement concrete affords a significant advantage over Portland cement concrete, especially in the case of preformed articles, in that the sulfur cement concrete can be remelted and recast. Thus, when defective or surplus articles are prepared, the sulfur aggregate composition can be reused by merely melting down the article and recasting the composition. Sulfur cement mortars can be used for similar purposes as Portland cement mortars, such as, for example, bonding structural members together. Sulfur cement mortars and concretes also generally have good corrosion resistance to acids and other chemicals.

Sulfur cement mortars and concretes are well known to the art and various modifications are described in the patent literature such as, for example, U.S. Pat. Nos. 2,135,747, 3,954,480, 4,025,352, 4,058,500, and 4,188,230. C. W. Davis in Industrial and Engineering Chemistry, Vol. 19, No. 12, pages 1350–1352 (1927) teaches that pH control including treating bentonite and clays with aqueous hydrochloric acid reduces swelling as compared with water.

As in the case of Portland cement products, sulfur cement products are subject to freeze-thaw degradation, resulting in brittleness, cracking, crumbling, loss of strength or general failure of the product. Thus, it would be very desirable to provide sulfur cement products which have improved resistance to freeze-thaw degradation.

SUMMARY OF THE INVENTION

The present invention provides sulfur cement products having greatly improved resistance to freeze-thaw degradation and further exhibit improved water resistance and aging. In the molten stage, the sulfur cement-aggregates of the present invention have higher viscosities facilitating the use of a greater proportion of sulfur binder relative to the aggregate in obtaining a workable mix. Higher binder content, in turn, generally improves durability. These advantages are obtained according to the present invention by treating molten sulfur cement with phosphoric acid.

In one embodiment, the invention comprises a sulfur cement-aggregate composition, comprising sulfur cement, aggregate, and an amount of phosphoric acid effective to improve the resistance of said composition to freeze-thaw degradation.

In another embodiment, the invention provides a process for preparing a sulfur cement-aggregate composition which comprises the improvement of adding to said composition prior to solidification an amount of phosphoric acid effective to substantially improve the freeze-thaw resistance of the composition after solidification.

The invention will be further described hereinbelow.

FURTHER DESCRIPTION OF THE INVENTION AND PREFERRED EMBODIMENTS

The present composition can be prepared by simply adding the phosphoric acid to the molten sulfur cement-aggregate composition prior to solidification or to one of the components thereof prior to mixing with the other components. Thus the phosphoric acid can be added to either the sulfur cement or aggregate and is hence mixed with the composition at the same time that the sulfur cement is mixed with the aggregate, or preferably is added to the mixture of aggregate and sulfur cement.

With the exception that the phosphoric acid must, of course, be added prior to the solidification, the order of addition is not critical. Where plasticized sulfur is used as the cement, it is generally preferred to react the plasticizer with the sulfur before adding the aggregate. Also, as is conventional, it is preferred to heat the aggregate prior to admixture with the molten sulfur cement to remove moisture, avoid random cold spots and generally improve bonding of the sulfur cement to the aggregate. The sulfur cement and aggregate, including any other ingredients, are mixed together at temperatures above the melting point of sulfur or plasticized sulfur and below the decomposition or boiling point of the materials. Typically, such mixing is conducted at temperatures in the range of about from 110° to 160° C. and preferably, about from 125° to 150° C. Generally, I have found that very good results in terms of mixing convenience and the production of a good product are obtained by mixing at temperatures of about from 135° to 145° C. Optimum mixing temperatures can vary depending on whether a plasticizer is used and the particular plasticizer used and can be determined by routine optimization tests. The molten mixture can then be cast into the desired shape or form. Upon cooling, the composition solidifies into a final product having improved water stability. When filler is used in the composition of this invention, it is preferably added last.

In accordance with the practice of the present invention, an amount of phosphoric acid effective to improve the freeze-thaw resistance of the solidified composition is used. Typically, about from 0.1 to 3% by weight of phosphoric acid (based on $H_3PO_4$ content) per the total weight of the composition is used. Generally, excellent results are obtained using about from 0.3 to 1.5% by weight phosphoric acid (based on $H_3PO_4$ content).

The term "phosphoric acid", as used herein, includes all the various monophosphoric and polyphosphoric acids, for example, orthophosphoric, pyrophosphoric and tetraphosphoric acids, and the like and mixtures thereof [for example, $H_3PO_4.P_2O_5.(H_2O)_x$ which is a mixture of orthophosphoric and pyrophosphoric acid]. Conveniently, the readily commercially available forms of phosphoric acid such as aqueous 86 wt % $H_3PO_4$ acid or aqueous 75 wt % $H_3PO_4$ acid can be used. Where polyphosphoric acids are used, phosphoric acid strength is calculated, in accordance with conventional practice, on the basis of $H_3PO_4$ weight content. Thus, $H_3PO_4$ has a phosphoric acid strength of 100% whereas $H_4P_2O_7$ has a phosphoric acid strength of 110% calculated as follows:

$$2H_3PO_4 = H_4P_2O_7 + (H_2O).$$

By this equation, 1 mol of $H_4P_2O_7$ ($M_w = 178$) is equivalent to 2 mols of $H_3PO_4$ ($M_w = 98$). Thus, phosphoric acid strength $= [2(98) \div 1(178)] \times 100 = 110\%$.

The phosphoric acid can be added to the composition at various times, for example, it can be admixed with the molten sulfur cement-aggregate mixture or it can be added to the aggregate, either before or after heating and prior to the addition of sulfur cement. It also can be premixed with the molten sulfur cement prior to mixing with the aggregate.

The remaining components of the sulfur cement-aggregate compositions are not unique to the present invention, save that the present invention permits the use of a higher sulfur cement to aggregate ratio. Also, generally much better products are obtained using a sulfur cement containing plasticized sulfur than are obtained with pure sulfur.

The sulfur cement used in the present compositions can be unaltered sulfur and/or plasticized sulfur and if desired can contain minor amounts of various compatible additives (e.g., flame retardants, ductilating agents, etc.). The term "plasticized sulfur" refers to the reaction product of sulfur with a plasticizer and/or mixtures of sulfur and plasticizers prior to reaction and/or the reaction product of sulfur with a plasticizer plus unreacted sulfur and any combination thereof. ["Sulfur content" (or "total sulfur") as used herein includes both unreacted sulfur and the sulfur content of such reaction products.] Although it is not wholly necessary to use plasticized sulfur as the sulfur cement, the compositions of invention using plasticized sulfur generally have much superior water stability to the corresponding composition using sulfur without a plasticizer. Where a plasticizer is used, the amount of the plasticizer(s) will vary with the particular plasticizer and the properties desired in the cement. The cement can contain about from 0.1 to 30% of the plasticizer and typically will contain about from 2 to 10%, preferably about 2½ to 5%, by weight of the plasticizer, based on the weight of total sulfur.

The term "sulfur plasticizer" or "plasticizer" refers to materials or mixtures of materials which, when added to sulfur, lower its melting point and increase its crystallization time. One convenient way to measure the rate of crystallization is as follows: The test material (0.040 g) is melted on a microscope slide at 130° C. and is then covered with a square microscope slide cover slip. The slide is transferred to a hot plate and is kept at a temperature of 70°±2° C., as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to molten elemental sulfur, cause an increase in crystallization time in reference to the elemental sulfur itself.

A wide variety of sulfur plasticizer can be used including, for example, those described in U.S. Pat. Nos. 4,058,500; 4,190,460; 4,293,463; 4,308,072; 3,997,355; U.S. Bureau of Mines U.S. patent application 085,450, filed October 1979, a copy of which is publicly available from the Department of Commerce; and in the Proceedings of Sulphur '81, Sulphur Development Institute of Canada, G. D. Love—Sulphur Concretes in Highway Application.

Very good results have been obtained by using oligomers of cyclopentadiene or methylcyclopentadiene and mixtures of such oligomers as well as mixtures of such oligomers with dicyclopentadiene and/or di(methylcyclopentadiene).

Other suitable sulfur plasticizers which can be used include, for example, unsaturated aliphatic compounds, aromatic compounds, styrene, dicyclopentadiene, di(methylcyclopentadiene), acrylic acid, soybean oil, and the like. The reaction product of such compounds with sulfur can also be considered as a plasticizer, which can be stored and later added to additional unreacted sulfur prior to addition of the aggregate.

Suitable aromatic plasticizers include: phenol, aniline, N-methyl aniline, 3-hydroxy thiophene, 4-hydroxy pyridine, p-aminophenol, hydroquinone, resorcinol, meta-cresol, thymol, 4,4'-dihydroxy biphenyl, 2,2-di(p-hydroxyphenol) propane, di(p-hydroxyphenyl) methane, etc., p-phenylene diamine, methylene dianiline.

Where aromatic plasticizers are used the plasticized sulfur product can be prepared by reacting 1 mol of an aromatic carbocyclic or heterocyclic compound, substituted by at least one functional group of the class —OH or —NHR in which R is H or lower alkyl with at least 2 mols of sulfur. This reaction is typically conducted at temperatures in the range of about from 120° to 170° C. for 1 to 12 hours, usually in the presence of a base catalyst such as sodium hydroxide. (See for example, Angew, Chem. Vol. 70, No. 12, Pages 351–67 (1958). The polysulfide product made in this way has a mol ratio of aromatic compound:sulfur of 1:2 to 1:10, preferably from 1:3 to 1:7. Upon completion of the reaction, the caustic catalyst is neutralized with an acid such as phosphoric or sulfuric acid. Organic acids may also be used for this purpose. The resulting aromatic polysulfide may be used immediately or it may be cooled and stored for future use.

Another type of aliphatic polysulfide useful as a plasticizer for this invention are the linear aliphatic polysulfides. Although these polysulfides may be used alone as the sulfur plasticizer, it is preferred to use them in combination with either (a) dicyclopentadiene or (b) the aromatic polysulfides described above, especially with the phenol-sulfur adduct. In this connection, the preferred plasticizer mixtures contain from 5 to 60% by weight linear aliphatic polysulfide, based on total plasticizer, preferably about 20 to 50% by weight.

These aliphatic polysulfides may have branching indicated as follows:

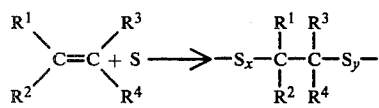

wherein x and y are independently an integer of from 2 to 6 and wherein $R^1$, $R^2$, $R^3$, $R_4$ are independently H, alkyl, aryl, halogen, nitrile, carboxy, ester or amide group or any two of $R^1$, $R^2$, $R^3$, and $R^4$ can together with the carbon atoms to which they are joined form a carbocyclic ring. Thus, in this connection the aliphatic polysulfide is preferably a linear polysulfide. The chain with the sulfur preferably is linear, but it can have side groups as indicated by the R's in the above formula. The side group may be aromatic. Thus, styrene can be used to form a phenyl-substituted linear aliphatic polysulfide. The preferred aliphatic polysulfides of this type are both linear and nonbranched.

Unbranched linear aliphatic polysulfides include, for example, those containing an ether linkage and having the recurring unit:

$$-S_xCH_2CH_2OCH_2OCH_2CH_2S_y-$$

wherein x and y independently typically are an integer of from 2–4. The ether constituent of this aliphatic polysulfide is relatively inert to reaction. Other suitable aliphatic polysulfides have the following recurring units:

- $-S_x+CH_2)_zS_y-$ from reaction of alpha, omega-dihaloalkanes and sodium polysulfide;
-  from reaction of alpha, omega-dihalosulfides and sodium polysulfide;

and

- $-S_x+CH_2CH_2-O-CH_2CH_2)_zS_y-$ from reaction of alpha, omega-dihaloethers and sodium polysulfide wherein x and y are independently an integer of 2 to 5; and z is an integer of 2 to 10.

Compatible mixtures of different plasticizers can be used and in some instances, it is preferred to use mixtures of materials having different reactivities with sulfur as the plasticizer. Also, inorganic plasticizers such as, for example, the sulfides of iron, arsenic and phosphorus, etc. can also be used, though generally, the preferred plasticizers are organic compounds.

The sulfur concrete or mortar of this invention also preferably contains very fine particle sized fillers such as, for example, fly ash, talc, mica, silica flour, graphite, carbon black, pumice, insoluble salts (e.g., barium carbonate, barium sulfate, calcium carbonate, calcium sulfate, magnesium carbonate, etc.), magnesium oxide, and mixtures thereof. Such fillers typically have a particle size less than 100 mesh (U.S.A. Standard Testing Sieves) and preferably, less than 200 mesh. Such fillers generally act as thickening agents and generally improve the hardness or strength of the sulfur cement product. Where fillers are used, the sulfur cement typically contains about from 1 to 15% by weight, and more generally, about from 5 to 10% of the filler, based on the weight of the total composition including aggregate and binder.

Various other additives can be added as desired to alter various properties of the sulfur cement, as is well-known to the art; see, for example, U.S. Pat. Nos. 4,188,230 (durability altered by the addition of certain petroleum products), and 4,210,458 (viscosity altered by the addition of polyhydric alcohols).

The principal sub-genuses of the present composition are sulfur cement mortars and sulfur concretes. The two compositions are actually very substantially the same with the exception of the size of the principal aggregate component. Typically, in the case of the present sulfur cement mortars, the mortar contains about from 10 to 60% by weight, preferably about from 15 to 30% by weight, of sulfur cement and about from 40 to 90% by weight, preferably about from 75 to 85% by weight, fine sized aggregate. Since generally the aggregate is the major component of the composition, it is generally reduced, for the sake of convenience, in calculating the amount of the aggregate by the amount of phosphoric acid used. Typically, this reduction is not significant, since as before mentioned, typically the amount of phosphoric acid used is less than about 3% by weight. Typically, the fine sized aggregate generally has a particle size less than about No. 8 mesh (U.S.A. Standard Testing Sieves). Suitable fine size aggregate include plaster sand, Kaiser top sand, Monterey sand, Vulcan sands, dune sand, crushed quartz, and the like, and mixtures thereof.

The sulfur cement concretes are similar to the sulfur cement mortars except that coarse aggregate is used along with or in place of all or a portion of the fine size aggregate. Typically, the coarse aggregate has a particle size of about from No. 8 to 1½ inches, preferably about from No. 8 to ¾ inches. The fine sized aggregate generally has a particle size below about ⅜ inch, preferably in the No. 4 to No. 100 mesh range. Suitable examples of such small sized aggregate have already been illustrated hereinabove with respect to the sulfur cement mortar of the present invention.

Typically, the sulfur cement concrete comprises, by weight, about from 10 to 60% total sulfur cement; 15 to 75% coarse aggregate; and 25 to 70% fine aggregate. As in the case of mortars, the amount of aggregate is typically reduced by the amount of phosphoric acid, since the reduction is not significant.

Typically the same aggregate and filler gradation patterns as used for Portland cement mortars and concretes and asphalt concretes can be conveniently used for the present sulfur cement mortars and concretes. Examples of typical gradation patterns can be had by reference to ASTM Designation D-448 (coarse aggregate) and ASTM Designation C-33 (fine aggregate). These patterns can then be optimized or pragmatically adjusted to meet the constraints of the locally available aggregate and fillers, by routine procedures.

As used herein, the term "mesh" are measured in and refers to the "U.S.A. Standard Testing Sieves" system also known as "U.S. Sieve Series". Particular size distributions are given in weight percent of material passing through or less than (<) a given mesh. The term "room temperature" refers to about 20°–25° C.

A further understanding of the invention can be had from the following non-limiting examples.

EXAMPLE 1

This example illustrates the composition and process of the invention, and the improved resistance to freeze-thaw degradation afforded by the present invention.

A control sulfur cement-aggregate composition containing 16% by weight plasticized sulfur (95% by weight sulfur, 2.5% by weight dicyclopentadiene and 2.5% by weight cyclopentadiene oligomer), 6% by weight silica flour, 42.9% by weight ⅜" pea gravel (particle size distribution 100% <⅜ inch, 16% <No. 4 mesh, 1% <No. 8 mesh, 0% <No. 16 mesh), and 35.1% by weight plaster sand (particle size distribution 100% <No. 4 mesh, 99% <No. 8 mesh, 93% <No. 16 mesh, 69% <No. 30 mesh, 28% <No. 50 mesh, 7% <No. 100 mesh, 2% <200 mesh, 0% <No. 325 mesh) was prepared by oven drying the gravel and sand to 210° C. The hot aggregate was then admixed with room temperature sulfur cement. The aggregate and sulfur cement were thoroughly mixed and then the silica flour (particle size distribution 100% <No. 100 mesh, 95% <No. 200 mesh, 80% <No. 325 mesh) was admixed in. The composition was then cast at about 135° C. into a number of 3"×3"×14" 7.62 cm×7.62 cm×35.56 cm) beams and allowed to cool to room temperature and then aged for 2 to 4 days before testing.

A composition illustrating the present invention was prepared following the same general procedure and using the same components and relative concentrations but in this instance 0.6% by weight of aqueous 86% by weight phosphoric acid (0.516% by weight $H_3PO_4$) was admixed with the sulfur cement-aggregate mixture prior to the addition of the silica flour. Also, the amount of the aggregate was reduced to 42.6%, by weight, pea gravel and 34.8%, by weight plaster sand. The test composition was then cast at about 136° C. into a number of beams and then cooled and aged in the same manner as the control composition. The shape and size of the control composition beams and test composition beams were identical.

The dynamic Young's modulus of elasticity was determined for the control composition beams and the test composition beams using the American National Standard Test Method ANSI/ASTM C 215-60 (Reapproved 1976) entitled "Standard Test Method For Fundamental Transverse, Longitudinal, and Torsional Frequencies Of Concrete Specimens". A number of freeze-thaw tests were conducted for both the control beams and test beams. The tests were conducted by placing one or more beams in a standard freezing and thawing apparatus and then subjecting it to a number of rapid freezing and thawing cycles in water in accordance with the American National Standard Test Method ANSI/ASTM C 666-77, Procedure A, "Standard Test Method For Resistance Of Concrete To Rapid Freezing And Thawing". The beams were subjected to a number of freeze-thaw cycles (each freeze-thaw sequence constitutes one cycle) and then re-examined, as before, for Young's modulus of elasticity. A loss of 40% of the original Young's modulus constitutes failure. A total of five control composition beams and seven test composition beams were tested in this manner following the identical test procedure.

All of the control composition beams failed at between 30 to 60 cycles whereas the test composition beams did not fail until between 140 to 340 cycles. Moreover, the test composition beams did not crack even at the Young's modulus failure point whereas the control composition beams were generally badly cracked when they failed and in some instances were cracked even before they failed the Young's modulus test.

EXAMPLE 2

In this example, the same procedure as described in Example 1 was followed but using a limestone containing aggregate. Also in this example four control aggregate beams and only one test composition beam were prepared. The control composition was composed of 16% by weight plasticized sulfur (95% by weight sulfur, 2.5% by weight dicyclopentadiene and 2.5% by weight cyclopentadiene oligomer), 35.1% by weight No. 7 Texas limestone (particle size distribution 100% <¾", 97% <½", 67% <⅜", 3% <No. 4 mesh, 1% <No. 16 mesh), 32.2% by weight plaster sand, 10.7% by weight No. 1 Monterey sand (particle size distribution 100% <No. 4 mesh, 54% <No. 8 mesh, 0% <No. 16 mesh), and 6% by weight silica flour. The same type of plaster sand and silica flour as used in Example 1 was used in this example. The test composition was identical to the control composition with the exception that it contained 0.6% by weight aqueous 86% by weight phosphoric acid (0.516% by weight $H_3PO_4$), 34.8% by weight No. 7 Texas limestone, and 31.9% by weight plaster sand. The control composition and test composition were cast into identically sized and shaped test beams as in Example 1. The dynamic Young's modulus of four control beams and one test beam were determined as described in Example 1 hereinabove. The beams were respectively placed in the freezing-thawing apparatus and periodically removed and re-examined for Young's modulus as described in Example 1. The identical test procedure was followed for each beam. As in the case of Example 1, a beam was considered to have failed when its Young's modulus was reduced to 60% of its original value.

All four of the control composition beams failed after between 10 to 40 freeze-thaw cycles whereas the test composition beam did not fail until 300 freeze-thaw cycles.

Obviously, many modifications and variations of the invention described hereinabove and below can be made without departing from the essence and scope thereof.

What is claimed is:

1. A sulfur cement-aggregate composition, comprising sulfur cement, aggregate, and an amount of phosphoric acid effective to substantially improve the resistance of said composition to freeze-thaw degradation.

2. The composition of claim 1 wherein said phosphoric acid is selected from the group of monophosphoric acids, polyphosphoric acids, and mixtures thereof.

3. The composition of claim 1 wherein said phosphoric acid is aqueous 86% phosphoric acid.

4. The composition of claim 1 wherein said composition comprises about from 0.1 to 3% by weight of said phosphoric acid based on the $H_3PO_4$ content thereof.

5. The composition of claim 4 wherein said composition comprises about from 0.3 to 1.5% by weight of said phosphoric acid based on the $H_3PO_4$ content thereof.

6. The composition of claim 1 wherein said sulfur cement comprises plasticized sulfur.

7. The composition of claim 6 wherein said plasticized sulfur is plasticized with a plasticizer selected from the group consisting of dicyclopentadiene, di(methylcyclopentadiene), oligomers of cyclopentadiene, oligomers of methylcyclopentadiene and mixtures thereof.

8. The composition of claim 7 wherein said plasticizer is a mixture of dicyclopentadiene and oligomers of cyclopentadiene.

9. The composition of claim 7 wherein said plasticizer is a mixture of di(methylcyclopentadiene) and oligomers of methylcyclopentadiene.

10. The composition of claim 1 or 4 wherein said composition comprises about from 10 to 60% by weight of said sulfur cement and about from 40 to 90% by weight of said aggregate.

11. The composition of claim 1 wherein said composition comprises a powdered filler material having mesh sizes less than about 200 mesh.

12. A process for preparing a sulfur cement-aggregate composition which comprises admixing molten sulfur cement, aggregate, and an amount of phosphoric acid effective to substantially improve the resistance of said composition to freeze-thaw degradation.

13. The process of claim 12 wherein said phosphoric acid is selected from the group of monophosphoric acids, polyphosphoric acids, and mixtures thereof.

14. The process of claim 12 wherein said phosphoric acid is aqueous 86% phosphoric acid.

15. The process of claim 12 wherein said composition comprises about from 0.1 to 3% by weight of said phosphoric acid based on the $H_3PO_4$ content thereof.

16. The composition of claim 15 wherein said composition comprises about from 0.3 to 1% by weight of said phosphoric acid based on the $H_3PO_4$ content thereof.

17. The process of claim 12 wherein said sulfur cement comprises plasticized sulfur.

18. The process of claim 17 wherein said plasticized sulfur is plasticized with a plasticizer selected from the group consisting of dicyclopentadiene, di(methylcyclopentadiene) oligomers of cyclopentadiene, oligomers of methylcyclopentadiene and mixtures thereof.

19. The process of claim 12 or 15 wherein said composition comprises about from 10 to 60% by weight of said sulfur cement and about from 40 to 90% by weight of said aggregate.

20. The process of claim 12 wherein a filler is admixed with the composition.

21. The process of claim 20 wherein the filler is added last.

22. The composition of claim 11 wherein the powdered filler material is silica flour.

23. The composition of claim 11 wherein the powdered filler material is fly ash.

24. The process of claim 12 wherein said phosphoric acid is added to a mixture of said sulfur cement and said aggregate.

* * * * *